US008983678B2

(12) United States Patent  (10) Patent No.: US 8,983,678 B2
Louie et al.  (45) Date of Patent: Mar. 17, 2015

(54) SYSTEM AND METHOD FOR DETERMINING VEHICLE SPEED

(75) Inventors: Justin Louie, Northville, MI (US); Xuefeng Tim Tao, Northville, MI (US)

(73) Assignee: GM Global Technology Operations LLC, Detroit, MI (US)

(*) Notice: Subject to any disclaimer, the term of this patent is extended or adjusted under 35 U.S.C. 154(b) by 964 days.

(21) Appl. No.: 12/887,743

(22) Filed: Sep. 22, 2010

(65) Prior Publication Data

US 2011/0313629 A1    Dec. 22, 2011

Related U.S. Application Data

(60) Provisional application No. 61/355,299, filed on Jun. 16, 2010.

(51) Int. Cl.
| | |
|---|---|
| *G05D 1/00* | (2006.01) |
| *G05D 3/00* | (2006.01) |
| *G06F 7/00* | (2006.01) |
| *G06F 17/00* | (2006.01) |
| *G01P 3/50* | (2006.01) |
| *G01P 11/00* | (2006.01) |

(52) U.S. Cl.
CPC .. *G01P 3/50* (2013.01); *G01P 11/00* (2013.01)
USPC ................ 701/1; 701/51; 701/55; 73/115.08; 340/441; 702/142

(58) Field of Classification Search
USPC ................ 701/1, 51, 55; 73/115.08; 180/170; 303/121, 166, 168, 177, 183, 184, 185; 340/441; 702/142
See application file for complete search history.

(56) References Cited

U.S. PATENT DOCUMENTS

| | | | | | |
|---|---|---|---|---|---|
| 4,552,239 | A | * | 11/1985 | Kanazawa et al. | 180/408 |
| 4,930,084 | A | * | 5/1990 | Hosaka et al. | 701/98 |
| 5,012,417 | A | * | 4/1991 | Watanabe et al. | 701/71 |
| 5,236,255 | A | * | 8/1993 | Kuwana et al. | 303/158 |
| 5,239,470 | A | * | 8/1993 | Komatsu | 701/33.4 |
| 5,305,214 | A | * | 4/1994 | Komatsu | 701/32.9 |
| 5,371,718 | A | * | 12/1994 | Ikeda et al. | 367/91 |
| 5,375,918 | A | * | 12/1994 | Kuwana et al. | 303/144 |
| 5,522,652 | A | * | 6/1996 | Negrin et al. | 303/154 |
| 5,579,230 | A | * | 11/1996 | Lin et al. | 701/70 |
| 5,590,217 | A | * | 12/1996 | Toyama | 382/104 |

(Continued)

FOREIGN PATENT DOCUMENTS

| | | |
|---|---|---|
| DE | 19503270 A1 | 8/1996 |
| DE | 102008019818 A1 | 7/2009 |

(Continued)

OTHER PUBLICATIONS

Office Action dated Oct. 1, 2012 from the German Patent Office for German Patent Application No. 10 2011 103 945.0, 5 pages.

*Primary Examiner* — Khoi Tran
*Assistant Examiner* — Jaime Figueroa

(57) ABSTRACT

A system for a vehicle includes a speed determination module, a buffer module, and a speed prediction module. The speed determination module determines changes in measured vehicle speed. The buffer module stores the determined changes in measured vehicle speed. The speed prediction module predicts a speed of the vehicle when the measured vehicle speed is less than a predetermined threshold, wherein the predicted vehicle speed is based on an average of the stored changes in measured vehicle speed.

20 Claims, 4 Drawing Sheets

(56) References Cited

U.S. PATENT DOCUMENTS

| | | | |
|---|---|---|---|
| 5,612,873 A * | 3/1997 | Ogawa | 701/51 |
| 5,765,931 A * | 6/1998 | Ito et al. | 303/183 |
| 6,044,315 A * | 3/2000 | Honeck et al. | 701/33.4 |
| 7,569,948 B2 * | 8/2009 | Davis et al. | 307/10.1 |
| 2002/0028681 A1 * | 3/2002 | Lee et al. | 455/456 |
| 2004/0093128 A1 * | 5/2004 | Kin | 701/1 |
| 2007/0088465 A1 * | 4/2007 | Heffington | 701/1 |
| 2008/0071452 A1 * | 3/2008 | Tan et al. | 701/70 |
| 2010/0250087 A1 * | 9/2010 | Sauter | 701/93 |
| 2011/0127097 A1 * | 6/2011 | Hodzic et al. | 180/197 |

FOREIGN PATENT DOCUMENTS

| | | | |
|---|---|---|---|
| DE | 102008009406 A1 | 8/2009 | |
| GB | 2297619 A * | 8/1996 | G01P 13/00 |
| JP | 02238364 A * | 9/1990 | G01P 1/07 |

* cited by examiner

SYSTEM AND METHOD FOR DETERMINING VEHICLE SPEED

CROSS-REFERENCE TO RELATED APPLICATIONS

This application claims the benefit of U.S. Provisional Application No. 61/355,299, filed on Jun. 16, 2010. The disclosure of the above application is incorporated herein by reference in its entirety.

FIELD

The present disclosure relates to vehicles and more particularly to a system and method for determining vehicle speed.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air/fuel (A/F) mixture within cylinders to drive pistons that rotatably turn a crankshaft and generate drive torque. A transmission transfers the drive torque from the crankshaft to a driveline (e.g., wheels) of a vehicle. A transmission output shaft speed (TOSS) sensor measures a rotational speed of an output shaft of the transmission (e.g., in revolutions per minute, or RPM). The speed of the vehicle may be determined based on the TOSS.

SUMMARY

A system for a vehicle includes a speed determination module, a buffer module, and a speed prediction module. The speed determination module determines changes in measured vehicle speed. The buffer module stores the determined changes in measured vehicle speed. The speed prediction module predicts a speed of the vehicle when the measured vehicle speed is less than a predetermined threshold, wherein the predicted vehicle speed is based on an average of the stored changes in measured vehicle speed.

A method for determining a speed of a vehicle includes determining changes in measured vehicle speed, storing the determined changes in measured vehicle speed in a buffer, and predicting the speed of the vehicle when the measured vehicle speed is less than a predetermined threshold, wherein the predicted vehicle speed is based on an average of the stored changes in measured vehicle speed.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
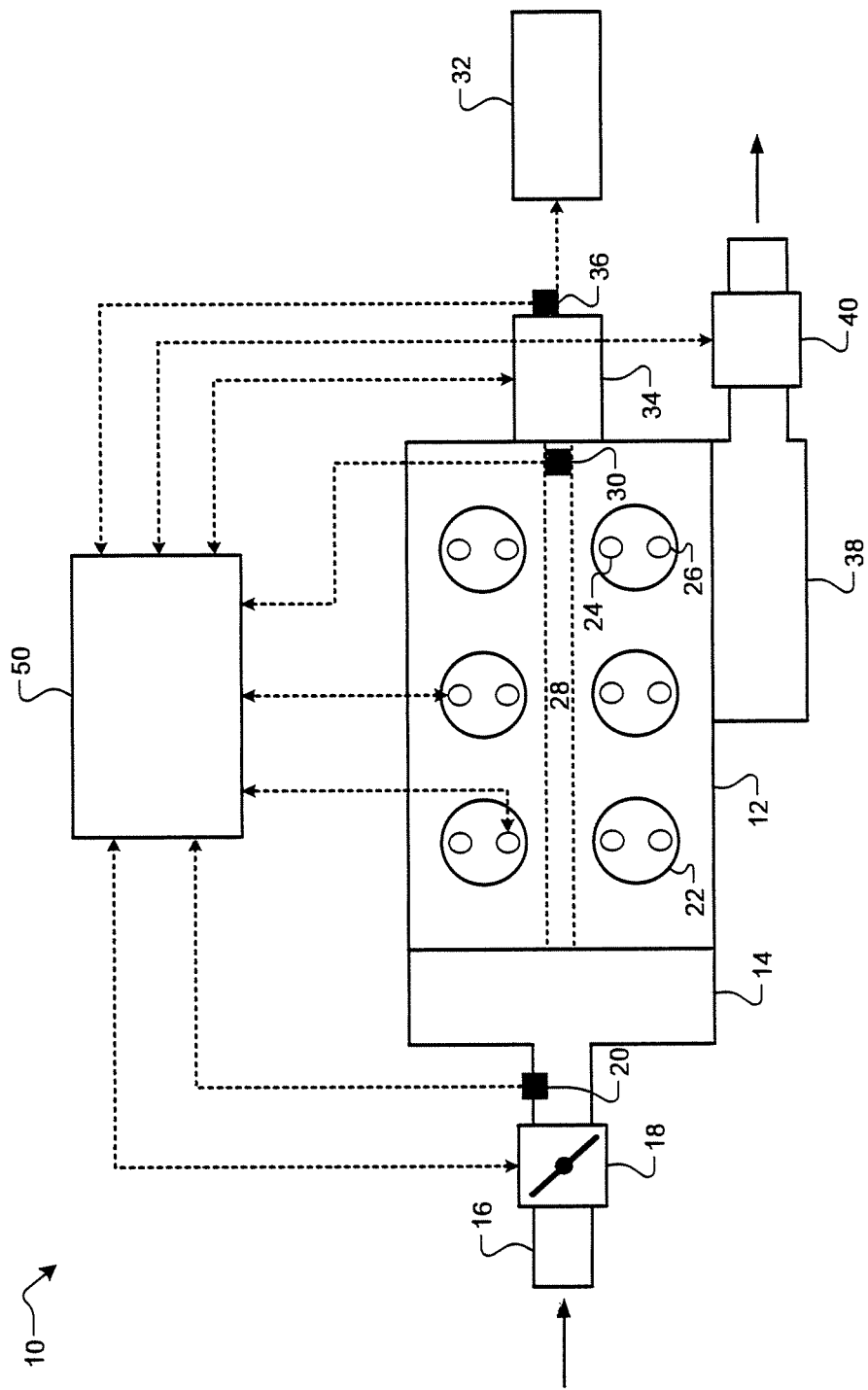
FIG. 1 is a functional block diagram of an exemplary vehicle according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Vehicle speed may be determined based on a signal from a transmission output shaft speed (TOSS) sensor (a "TOSS signal"). The TOSS signal, however, may be susceptible to noise, particularly at low vehicle speeds (e.g., less than a predetermined speed). For example, the TOSS signal may include noise when the vehicle is traveling across uneven ground. Conventional vehicles, therefore, may implement a different type of TOSS sensor (e.g., a TOSS sensor having more teeth) to improve accuracy of the TOSS signal and thus the determined vehicle speed. Implementing a different type of TOSS sensor, however, may increase costs and/or complexity.

Accordingly, a system and method are presented for improved determination of vehicle speed. The system and method measures vehicle speed based on the TOSS signal (i.e., pulses from a TOSS sensor). The system and method then determines and stores changes in the measured vehicle speed. For example, the changes in the measured vehicle speed may include slopes between two consecutive measured vehicle speeds. The system and method store the changes in measured vehicle speed in a buffer. For example, the buffer may include memory such as non-volatile memory (NVM).

The system and method may then predict vehicle speed based on an average of the stored changes in measured vehicle speed. Therefore, the predicted vehicle speed is less susceptible to TOSS sensor noise compared to measured vehicle speed. For example, the system and method may predict the vehicle speed when no vehicle speed is measured (e.g., the TOSS signal is zero, or has a magnitude less than a predetermined threshold).

When the measured vehicle speed has been less than a predetermined threshold for a predetermined period, however, the system and method may reset the buffer until a vehicle speed greater than the predetermined threshold is measured. For example only, the predetermined threshold may correspond to a measured vehicle speed of zero. Additionally, the system and method may wait for N measured vehicle speeds greater than the predetermined threshold before predicting vehicle speed. For example, the system and method may wait for N measured vehicle speeds greater than the predetermined threshold after an initial start-up or after a reset.

The system and method may also detect an inflection point (i.e., a point when the vehicle transitions between accelerating and decelerating). For example, the system and method may detect an inflection point when the direction (i.e., polarity) of the changes in measured vehicle speeds has changed for M consecutive measured vehicle speeds. When an inflection point has been detected, the system and method may reset the buffer and load the buffer with a new average slope calculated using measured vehicle speed after the detection of the inflection point. In other words, the system and method waits for X measured vehicle speeds before loading the buffer and resuming prediction of vehicle speed. For example, a larger X may increase prediction accuracy while increasing overshoot, whereas a smaller X may decrease prediction accuracy while decreasing overshoot.

Referring now to FIG. 1, a vehicle 10 includes an engine 12. For example, the engine 12 may include a spark ignition (SI) engine, a compression ignition (CI) engine (e.g., a diesel engine), or a homogeneous charge compression ignition (HCCI) engine. The vehicle 10, however, may also include a different type of engine and/or other components (e.g., an electric motor, a battery system, a generator, etc.), such as in an electric vehicle or a hybrid electric vehicle.

The engine 12 draws air into an intake manifold 14 through an inlet system 16 that may be regulated by a throttle 18. For example, the throttle 18 may be electrically controlled (e.g., electronic throttle control, or ETC). A mass air flow (MAF) sensor 20 measures a rate of airflow into the intake manifold 14. The air in the intake manifold 14 is distributed to a plurality of cylinders 22. While six cylinders are shown, the engine 12 may include other numbers of cylinders.

The air is combined with fuel from a plurality of fuel injectors 24 to create an air/fuel (A/F) mixture. For example, the fuel injectors 24 may inject the fuel into intake ports of the cylinders 22, respectively (e.g., port fuel injection), or directly into the cylinders 22, respectively (e.g., direct fuel injection). Additionally, for example, the fuel injectors 24 may inject the fuel at different times depending on the type of engine. The A/F mixture in the cylinders 22 may be compressed by pistons (not shown) and ignited by a plurality of spark plugs 26, respectively (e.g., SI engines or HCCI engines using spark assist). The air in the cylinders 22, however, may also be compressed by the pistons (not shown) and combusted by injecting the fuel into the pressurized air (e.g., CI engines, such as diesel engines).

The combustion of the A/F mixture drives the pistons (not shown) which rotatably turn a crankshaft 28 generating drive torque. An engine speed sensor 30 measures a rotational speed of the crankshaft 28 (e.g., in revolutions per minute, or RPM). The drive torque is transferred to a driveline 32 of the vehicle 10 by a transmission 34. In other words, the transmission 34 may multiply the drive torque at the crankshaft 28 by one of a plurality of gear ratios. For example, the transmission 34 may be coupled to the crankshaft 28 by a fluid coupling such as a torque converter.

A TOSS sensor 36 measures a rotational speed of an output shaft of the transmission 34 (e.g., in RPM). The measurement of the TOSS sensor 36 may indicate vehicle speed. For example, the TOSS sensor 36 may generate a signal (e.g., a pulse-width modulated, or PWM signal) having a frequency corresponding to the rotational speed of the crankshaft 28. In other words, the frequency of the signal from the TOSS sensor 36 increases as the TOSS increases. Additionally, for example, the TOSS sensor 36 may include a directional TOSS sensor.

Exhaust gas resulting from combustion is expelled from the cylinders 22 into an exhaust manifold 38. An exhaust treatment system 40 treats the exhaust gas in the exhaust manifold to decrease emissions before releasing the exhaust gas into the atmosphere. For example, the exhaust treatment system 40 may include one or more of catalytic converters, nitrogen oxide (NOx) absorbers/adsorbers, selective catalytic reduction (SCR) catalysts, and particulate matter (PM) filters. The vehicle 10 may also include other systems including, but not limited to a turbocharger or a supercharger, and an exhaust gas recirculation (EGR) system. Additionally, the vehicle 10 may also include other sensors or actuators.

A control module 50 communicates with and/or controls various components of the vehicle 10. Specifically, the control module 50 receives signals from the throttle 18, the MAF sensor 20, the fuel injectors 24, the spark plugs 26, the engine speed sensor 30, the transmission 34, the TOSS sensor 36, and/or the exhaust treatment system 40. The control module 50 controls the throttle (e.g., ETC), the fuel injectors 24, the spark plugs 26, the transmission 34, and/or the exhaust treatment system 40. The control module 50 may also implement the system or method of the present disclosure.

Figure 2:
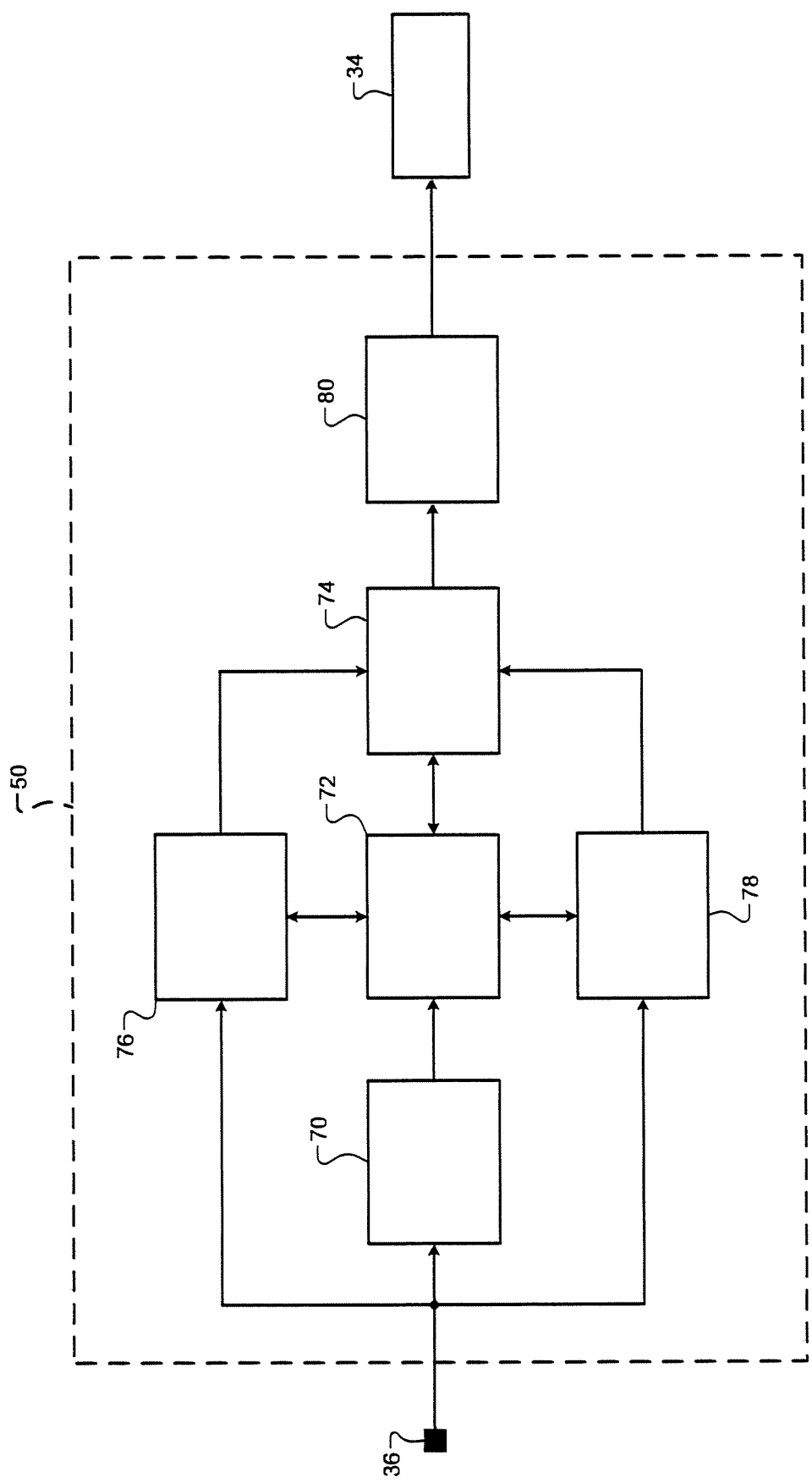
FIG. 2 is a functional block diagram of an exemplary control module according to the present disclosure.

Referring now to FIG. 2, the control module 50 is shown in more detail. The control module 50 includes a speed determination module 70, a buffer module 72, a speed prediction module 74, a reset module 76, an inflection point detection module 78, and a component control module 80. The control module 50 may also include memory (not shown) for storing determined and/or predetermined parameters. For example, the memory (not shown) may include non-volatile memory (NVM).

The speed determination module 70 receives the TOSS signal from the TOSS sensor 36. For example, the TOSS signal may include a plurality of pulses having a frequency based on the TOSS. Thus, the TOSS signal may indicate measured vehicle speeds. The speed determination module 70 may determine changes in the measured vehicle speeds. For example, the changes in measured vehicle speeds may include slopes between measured vehicle speeds. The buffer module 72 receives the changes in measured vehicle speed from the speed determination module 70. The buffer module 72 stores the changes in measured vehicle speeds. For example only, the buffer module 72 may store the changes in the measured vehicle speeds in the memory.

The speed prediction module 74 communicates with the buffer module 72. Specifically, the speed prediction module 74 may retrieve the stored changes in measured vehicle speeds from the buffer module 72. The speed prediction module 74 may determine an average change in measured vehicle speeds based on the stored changes in measured vehicle speeds. The speed prediction module 74 may then predict the vehicle speed based on an average of the stored changes in measured vehicle speeds. Thus, the predicted vehicle speed may be less susceptible to TOSS sensor noise (e.g., overshoots). Additionally, the speed prediction module 74 may predict the vehicle speed when the measured vehicle speed is less than the predetermined threshold.

When the measured vehicle speeds have been less than a predetermined threshold for a predetermined period, the reset module 76 may reset the buffer module 72 until a vehicle speed greater than the predetermined threshold is measured. In other words, the speed prediction module 74 may have to then wait for N measured vehicle speeds greater than the predetermined threshold before resuming prediction of vehicle speed. Additionally, the inflection point detection module 78 may detect a point when the vehicle transitions between accelerating and decelerating (an "inflection point"). For example, the inflection point detection module 78 may detect an inflection point when the polarity of the changes in measured vehicle speeds has changed for M consecutive measured vehicle speeds.

When an inflection point has been detected, the inflection point detection module 78 may reset and then load the buffer module 72 with a new average slope calculated based on measured vehicle speeds after the detection of the inflection point. In other words, the speed prediction module 74 may have to wait for X measured vehicle speeds until the buffer module 72 is loaded and prediction of vehicle speed may resume. For example, a larger value of X may increase prediction accuracy but also increase overshoot, whereas a smaller value of X may decrease prediction accuracy but also decrease overshoot.

The component control module 80 receives the predicted vehicle speed from the speed prediction module 74. The component control module 80 may control various components of the vehicle 10 based on the determined vehicle speed. Specifically, the component control module 80 may control the transmission 34 based on the predicted vehicle speed. For example, the component control module 80 may generate shift control signals for the transmission 34 based on the predicted vehicle speed. The component control module 80, however, may also control and/or communicated with other components of the vehicle 10 based on the predicted vehicle speed. For example, the component control module 80 may output the predicted vehicle speed to a speedometer.

Figure 3A:
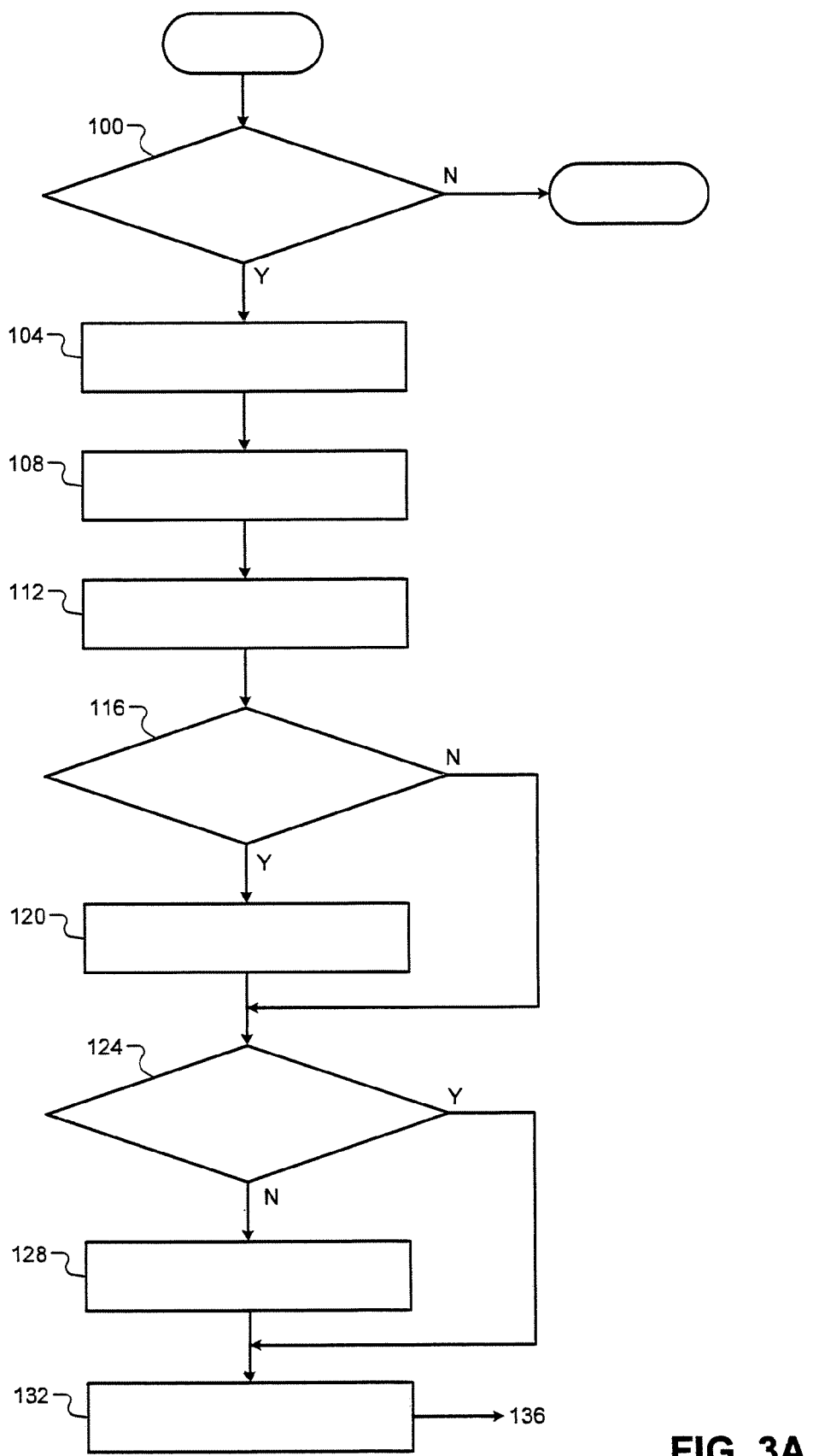
FIGS. 3A-3B are flow diagrams of an exemplary method for determining vehicle speed according to the present disclosure.
Figure 3B:
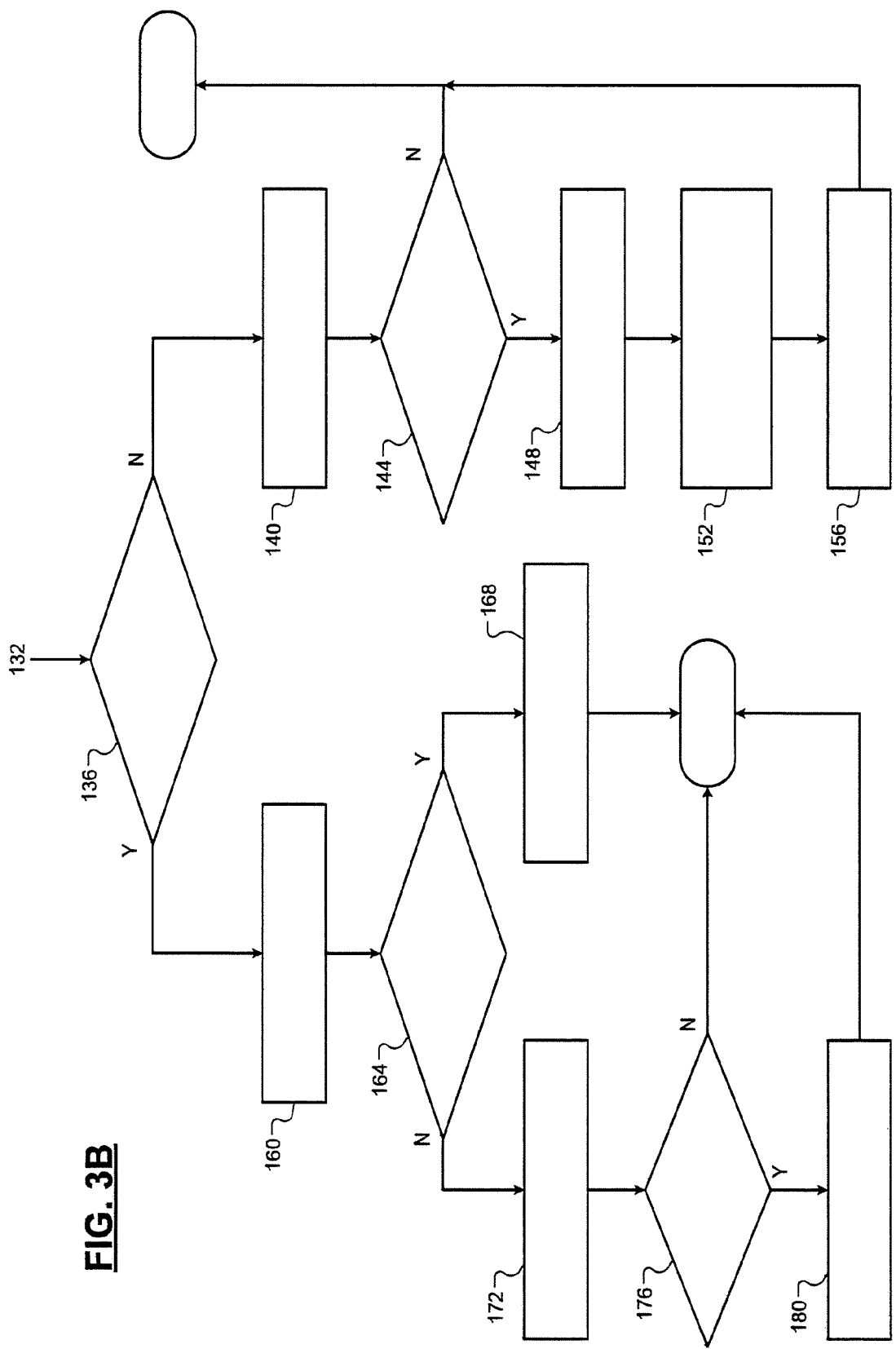

FIGS. 3A-3B illustrate a method for determining vehicle speed. Referring now to FIG. 3A, the method begins at 100. At 100, the control module 50 may determines whether to use predicted vehicle speed. For example, predicted vehicle speed may be used at low vehicle speeds when no TOSS signal pulses are detected. If true, control may proceed to 104. If false, control may end and the measured vehicle speed may be used.

At 104, the control module 50 may calculate a change in measured vehicle speeds (e.g., between a current measured vehicle speed and a previous measured vehicle speed). At 108, the control module 50 may store the change in measured vehicle speeds (e.g., in the buffer). At 112, the control module 50 may calculate an average of the stored changes in measured vehicle speeds. At 116, the control module 50 may determine whether the calculated average is outside of predefined limits. If true, control may proceed to 120. If false, control may proceed to 124.

At 120, the control module 50 may limit the calculated average to one of the predefined limits (i.e., a nearest one of upper and lower predefined limits). At 124, the control module 50 may determine whether a predetermined amount of the buffer is filled. If true, control may proceed to 132. If false, control may proceed to 128. At 128, the control module 50 may set the average change in measured vehicle speeds to zero (e.g., due to insufficient data). At 132, the control module 50 may update the buffer. Control may then proceed to 136.

Referring now to FIG. 3B, control may proceed to 136 from 132. At 136, the control module 50 may determine whether a sample period has ended. If true, control may proceed to 160. If false, control may proceed to 140. At 140, the control module 50 may store a measured vehicle speed (e.g., in a second buffer). At 144, the control module 50 may determine whether an inflection point has been detected. If true, control may proceed to 148. If false, control may end.

At 148, the control module 50 may reset the buffer. At 152, the control module 50 may calculate an average of changes in measured vehicle speeds after the detection of the inflection point. At 156, the control module 50 may fill the buffer based on the new calculated average of changes in measured vehicle speeds. For example, the control module 50 may fill the buffer with the new calculated average. Control may then end.

At 160, the control module 50 may set a previous vehicle speed. At 164, the control module 50 may determine whether a timeout occurred. For example, a timeout may occur when the measured vehicle speed is zero (i.e., below a predetermined vehicle speed) for greater than a predetermined period. If true, control may proceed to 164. If false, control may proceed to 168. At 164, the control module 50 may set the current vehicle speed to zero. Control may then end.

At 168, the control module 50 may increment a counter and calculate the current vehicle speed. At 172, the control module 50 may determine whether the calculated vehicle speed is greater than a maximum vehicle speed. In other words, the control module 50 may determine whether the calculated vehicle speed is incorrect (e.g., an overshoot). If true, control may proceed to 176. If false, control may end. At 176, the control module 50 may set the calculated vehicle speed to the maximum speed. Control may then end.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for a vehicle, comprising:
a speed determination module that determines changes in measured vehicle speed;
a buffer module that stores the determined changes in measured vehicle speed; and
a speed prediction module that predicts a speed of the vehicle when the measured vehicle speed is less than a predetermined threshold, wherein the predicted vehicle speed is based on an average of the stored changes in measured vehicle speed.

2. A system for a vehicle, comprising:
a speed determination module that determines changes in measured vehicle speed;
a buffer module that stores the determined changes in measured vehicle speed;
a speed prediction module that predicts a speed of the vehicle when the measured vehicle speed is less than a predetermined threshold, wherein the predicted vehicle speed is based on an average of the stored changes in measured vehicle speed; and
a reset module that resets the buffer module when the buffer module includes greater than Y stored changes having less than a predetermined value, wherein Y is an integer greater than or equal to zero.

3. The system of claim 2, wherein the reset module resets the buffer module when the measured vehicle speed has been less than the predetermined threshold for longer than a predetermined period.

4. The system of claim 3, wherein either initially or after the buffer module is reset, the speed prediction module waits for N measured vehicle speeds greater than the predetermined threshold or for a predetermined period before predicting vehicle speed, wherein N is an integer greater than or equal to one.

5. The system of claim 1, further comprising:
an inflection point detection module that detects a vehicle speed inflection point when a polarity of the changes in measured vehicle speed has changed for longer than a predetermined period.

6. A system for a vehicle, comprising:
a speed determination module that determines changes in measured vehicle speed;
a buffer module that stores the determined changes in measured vehicle speed;
a speed prediction module that predicts a speed of the vehicle when the measured vehicle speed is less than a predetermined threshold, wherein the predicted vehicle speed is based on an average of the stored changes in measured vehicle speed; and
an inflection point detection module that detects a vehicle speed inflection point when a polarity of the changes in measured vehicle speed has changed for longer than a predetermined period, wherein the inflection point detection module resets the buffer module when a vehicle speed inflection point is detected.

7. The system of claim 6, wherein after resetting the buffer module, the inflection point detection module loads the buffer module with an average of X changes in measured vehicle speed, wherein the X changes in measured vehicle speed correspond to a period after detecting the vehicle speed inflection point.

8. The system of claim 7, wherein after the buffer module is loaded, the speed prediction module resumes prediction of the vehicle speed.

9. The system of claim 1, further comprising:
a component control module that controls shifting of a transmission based on the predicted vehicle speed.

10. The system of claim 1, wherein the measured vehicle speed is based on measurements from one of a transmission output shaft speed (TOSS) sensor and an anti-lock braking system (ABS) wheel sensor.

11. A method for determining a speed of a vehicle, comprising:
determining changes in measured vehicle speed;
storing the determined changes in measured vehicle speed in a buffer; and
predicting the speed of the vehicle when the measured vehicle speed is less than a predetermined threshold, wherein the predicted vehicle speed is based on an average of the stored changes in measured vehicle speed.

12. A method for determining a speed of a vehicle, comprising:
determining changes in measured vehicle speed;
storing the determined changes in measured vehicle speed in a buffer;
predicting the speed of the vehicle when the measured vehicle speed is less than a predetermined threshold, wherein the predicted vehicle speed is based on an average of the stored changes in measured vehicle speed; and
resetting the buffer when the buffer includes greater than Y stored changes having less than a predetermined value, wherein Y is an integer greater than or equal to zero.

13. The method of claim 12, further comprising resetting the buffer when the measured vehicle speed has been less than the predetermined threshold for longer than a predetermined period.

14. The method of claim 13, further comprising either initially or after the buffer is reset, waiting for N measured vehicle speeds greater than the predetermined threshold or for a predetermined period before predicting vehicle speed, wherein N is an integer greater than or equal to one.

15. The method of claim 11, further comprising detecting a vehicle speed inflection point when a polarity of the changes in measured vehicle speed has changed for longer than a predetermined period.

16. A method for determining a speed of a vehicle, comprising:
determining changes in measured vehicle speed;
storing the determined changes in measured vehicle speed in a buffer;
predicting the speed of the vehicle when the measured vehicle speed is less than a predetermined threshold, wherein the predicted vehicle speed is based on an average of the stored changes in measured vehicle speed;
detecting a vehicle speed inflection point when a polarity of the changes in measured vehicle speed has changed for longer than a predetermined period; and
resetting the buffer when a vehicle speed inflection point is detected.

17. The method of claim 16, further comprising after resetting the buffer, loading the buffer module with an average of X changes in measured vehicle speed, wherein the X changes in measured vehicle speed correspond to a period after detecting the vehicle speed inflection point.

18. The method of claim 17, further comprising after the buffer is loaded, resuming prediction of the vehicle speed.

19. The method of claim 11, further comprising controlling shifting of a transmission based on the predicted vehicle speed.

20. The method of claim 11, further comprising measuring vehicle speed using one of a transmission output shaft speed (TOSS) sensor and an anti-lock braking system (ABS) wheel sensor.

* * * * *